US012673784B2

(12) United States Patent
Vasudeva et al.

(10) Patent No.: US 12,673,784 B2
(45) Date of Patent: Jul. 7, 2026

(54) SYSTEMS AND METHODS FOR FUEL FREEZE MITIGATION AND PREVENTION

(71) Applicant: Goodrich Aerospace Services Private Limited, Bangalore (IN)

(72) Inventors: Vishwanath Vasudeva, Bangalore (IN); Sagar Kulkarni, Bangalore (IN)

(73) Assignee: Collins Aerospace, Charlotte, NC (US)

( * ) Notice: Subject to any disclaimer, the term of this patent is extended or adjusted under 35 U.S.C. 154(b) by 944 days.

(21) Appl. No.: 17/961,721

(22) Filed: Oct. 7, 2022

(65) Prior Publication Data

US 2023/0111155 A1 Apr. 13, 2023

(30) Foreign Application Priority Data

Oct. 9, 2021 (IN) .............................. 202141046064

(51) Int. Cl.
B64D 37/32 (2006.01)
B64D 37/04 (2006.01)
(Continued)

(52) U.S. Cl.
CPC ............. B64D 37/32 (2013.01); B64D 37/04 (2013.01); B64D 37/06 (2013.01); B64D 41/00 (2013.01); H05B 3/00 (2013.01)

(58) Field of Classification Search
CPC ........ B64D 37/32; B64D 37/04; B64D 37/06; B64D 41/00; H05B 3/00; B01F 33/503
(Continued)

(56) References Cited

U.S. PATENT DOCUMENTS

| | | | | |
|---|---|---|---|---|
| 1,141,276 A | * | 6/1915 | Smith | ................... B01F 33/503 |
| | | | | 137/578 |
| 3,462,132 A | * | 8/1969 | Kaelin | ............. B01F 23/23421 |
| | | | | 416/177 |

(Continued)

FOREIGN PATENT DOCUMENTS

| | | | | |
|---|---|---|---|---|
| CN | 109279031 A | | 1/2019 | |
| DE | 102019211697 A1 | * | 2/2021 | ............. B60K 15/03 |

(Continued)

OTHER PUBLICATIONS

Machine Translation of DE-102019211697-A1, Hanneke Juergen, Feb. 11, 2021 (Year: 2021).*

(Continued)

*Primary Examiner* — Kimberly S Berona
*Assistant Examiner* — Katherine June Walter
(74) *Attorney, Agent, or Firm* — Kinney & Lange, P.A.

(57) ABSTRACT
A fuel freeze mitigation and/or prevention system includes a power generator configured and adapted to be positioned within a fuel storage tank. A fluid mover device is in electrical communication with the power generator. The fluid mover device is configured and adapted to be positioned within a fuel storage tank to mitigate or prevent fuel freeze in the fuel storage tank. A method for mitigating or preventing fuel freeze in a fuel storage tank includes harvesting energy with a power generator positioned within the fuel storage tank, charging a battery with the harvested energy, monitoring a fuel temperature inside the fuel storage tank, and turning a fluid mover device positioned within the fuel storage tank ON or OFF depending on at least one of a manual command or the fuel temperature inside the fuel storage tank to mitigate or prevent fuel freeze in the fuel storage tank.

14 Claims, 6 Drawing Sheets

(51) Int. Cl.
    *B64D 37/06*       (2006.01)
    *B64D 41/00*       (2006.01)
    *H05B 3/00*        (2006.01)

(58) Field of Classification Search
    USPC ......................................................... 137/59
    See application file for complete search history.

(56)             References Cited

U.S. PATENT DOCUMENTS

| | | | | |
|---|---|---|---|---|
| 4,882,099 | A * | 11/1989 | Durda | B01F 25/21 |
| | | | | 261/130 |
| 9,359,081 | B2 | 6/2016 | Clemen, Jr. et al. | |
| 2007/0039878 | A1 * | 2/2007 | Roberts | B01F 23/23421 |
| | | | | 210/605 |
| 2008/0118800 | A1 * | 5/2008 | Devriendt | H01M 8/0662 |
| | | | | 429/495 |
| 2011/0084171 | A1 | 4/2011 | Lam et al. | |
| 2014/0048651 | A1 * | 2/2014 | Haskins | B64C 3/187 |
| | | | | 244/123.1 |
| 2015/0246732 | A1 | 9/2015 | Kawano et al. | |
| 2016/0033085 | A1 * | 2/2016 | Sirosh | F17C 13/12 |
| | | | | 137/2 |
| 2016/0317989 | A1 * | 11/2016 | Nagler | B01F 33/813 |
| 2018/0134365 | A1 * | 5/2018 | Knipprath | B64C 1/062 |
| 2019/0170064 | A1 | 6/2019 | Sanders | |
| 2020/0189760 | A1 * | 6/2020 | Rokkam | H02J 50/23 |

FOREIGN PATENT DOCUMENTS

| | | | | |
|---|---|---|---|---|
| DK | 200000373 U3 * | 2/2001 | | B01F 33/503 |
| EP | 2698316 A2 | 2/2014 | | |
| EP | 3113238 A1 | 1/2017 | | |
| WO | 2014003862 A2 | 1/2014 | | |
| WO | WO-2021099086 A1 * | 5/2021 | | H01M 10/486 |

OTHER PUBLICATIONS

Machine Translation of DK-200000373-US, Jungar Stig-Johan, Feb. 9, 2001 (Year: 2001).*
Machine Translation of WO-2021099086-A1, Klee Hanspeter, May 27, 2021 (Year: 2021).*
Extended European Search Report dated Jan. 27, 2023, issued during the prosecution of European Patent Application No. EP 22200381.6, 12 pgs.

* cited by examiner

1

2nd ACT

1st ACT

Collector cell

Wing Inner cell

Wing Outer cell

0000000

Wing Center tank

101

Surge/vent tank

SYSTEMS AND METHODS FOR FUEL FREEZE MITIGATION AND PREVENTION

CROSS-REFERENCE TO RELATED APPLICATIONS

This application claims priority to Indian Provisional Patent Application No. 202141046064, filed Oct. 9, 2021, the disclosure of which is incorporated by reference herein in its entirety.

BACKGROUND OF THE INVENTION

1. Field of the Invention

The present disclosure relates to fuel tanks and more particularly to systems and methods for mitigating or preventing fuel freeze in the fuel tanks in aircrafts using green energy.

2. Description of Related Art

Traditional fuel-powered commercial airplanes store aircraft fuel in wings and the central fuselage (below passenger seats). The fuel tanks on wings are generally designated as the central tank, main tank or surge tank and are located on both the port and starboard sides of the aircraft. Airplanes fly at different altitudes and extreme weather conditions. When they fly through cold regions, they encounter risk of fuel freezing. At lower temperatures (e.g. less than 40° C.), the fuel tends to crystalize or waxy semi-solid fuel is likely to be formed. If the fuel freezes, the fuel pump, which pumps the fuel to the engine, can cease to operate causing potential failure of the aircraft.

At present, there are various techniques available to reduce the probability of fuel freezing. This includes detecting fuel temperature and displaying that information to the pilot. The pilot then decides what to do taking into account the fuel log sheet, and/or the mix of fuel types (A and A1). The options for the pilot typically include flying the aircraft at a lower altitude or flying faster, both which burn more fuel, or using engine oil as a heat exchanger on the wings or running hot water along the leading edge of the wings, both which require bulky hardware. Moreover, because the process requires the pilot to review and take action, legibility of the fuel log sheet, the mix of jet fuel types, and sensor position are all factors that may cause increased risk for fuel crystallization/wax formation before action can be taken.

The conventional techniques have been considered satisfactory for their intended purpose. However, there is a need for improved mitigation and/or prevention of fuel freeze to provide a more efficient and reliable aircraft. This disclosure provides a solution for this need.

SUMMARY

A fuel freeze mitigation and/or prevention system includes a power generator configured and adapted to be positioned within a fuel storage tank. A fluid mover device is in electrical communication with the power generator. The fluid mover device is configured and adapted to be positioned within a fuel storage tank to mitigate or prevent fuel freeze in the fuel storage tank.

In some embodiments, the system includes a battery in electrical communication with the power generator for storing power generated by the power generator and with the fluid mover device for powering the fluid mover device.

The fluid mover device can include swing rod having a first end and a second end. The second end can include at least one blade. The second end of the swing rod can be configured and adapted to rotate relative to the first end. The first end of the swing rod can be operatively connected to a rib of the fuel storage tank. The first end of the swing rod can be coupled to the rib of the fuel storage tank with a connecting pin positioned perpendicular to the swing rod. The power generator can include a piezoelectric transducer, and/or a thermocouple between two dissimilar metals. The piezoelectric transducer can be a plurality of piezoelectric transducers configured and adapted to generate millivolts in AC voltage during movement of fuel across the plurality of piezoelectric transducers.

The fuel storage tank can be positioned within a wing of an aircraft. The fuel storage tank can include at least one spar positioned therein extending in a longitudinal direction relative to the wing. The fuel storage tank can include at least one rib extending between a forward side of the wing and an aft side of the wing at an angle relative to the spar. The plurality of piezoelectric transducers can be mounted to at least one of the at least one rib or the at least one spar.

The power generator can include a thermocouple between two metals. The thermocouple can be electrically connected to a battery. The battery can be positioned between the thermocouple and the fluid mover device. The thermocouple can include a negative leg and a positive leg. The negative leg can be made from a first of the two metals and the positive leg can be made from a second of the two metals. The fuel storage tank can be positioned within a wing of an aircraft. The negative leg of the thermocouple can be mounted to a leading edge side of the fuel storage tank and wherein the positive leg is positioned aft of the negative leg. The positive leg of the thermocouple can be configured and adapted to float in fuel. The system can include a cable floater including an aperture positioned within the fuel storage tank. The positive leg of the thermocouple can pass through the cable floater to ensure that the positive leg maintains contact with an upper surface of the fuel. The thermocouple can include a plurality of thermocouples joined together to form a thermopile.

In accordance with another aspect, a method for mitigating or preventing fuel freeze in a fuel storage tank includes harvesting energy with a power generator positioned within the fuel storage tank, charging a battery with the harvested energy, monitoring a fuel temperature inside the fuel storage tank, and turning a fluid mover device positioned within the fuel storage tank ON or OFF depending on at least one of a manual command or the fuel temperature inside the fuel storage tank to mitigate or prevent fuel freeze in the fuel storage tank.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
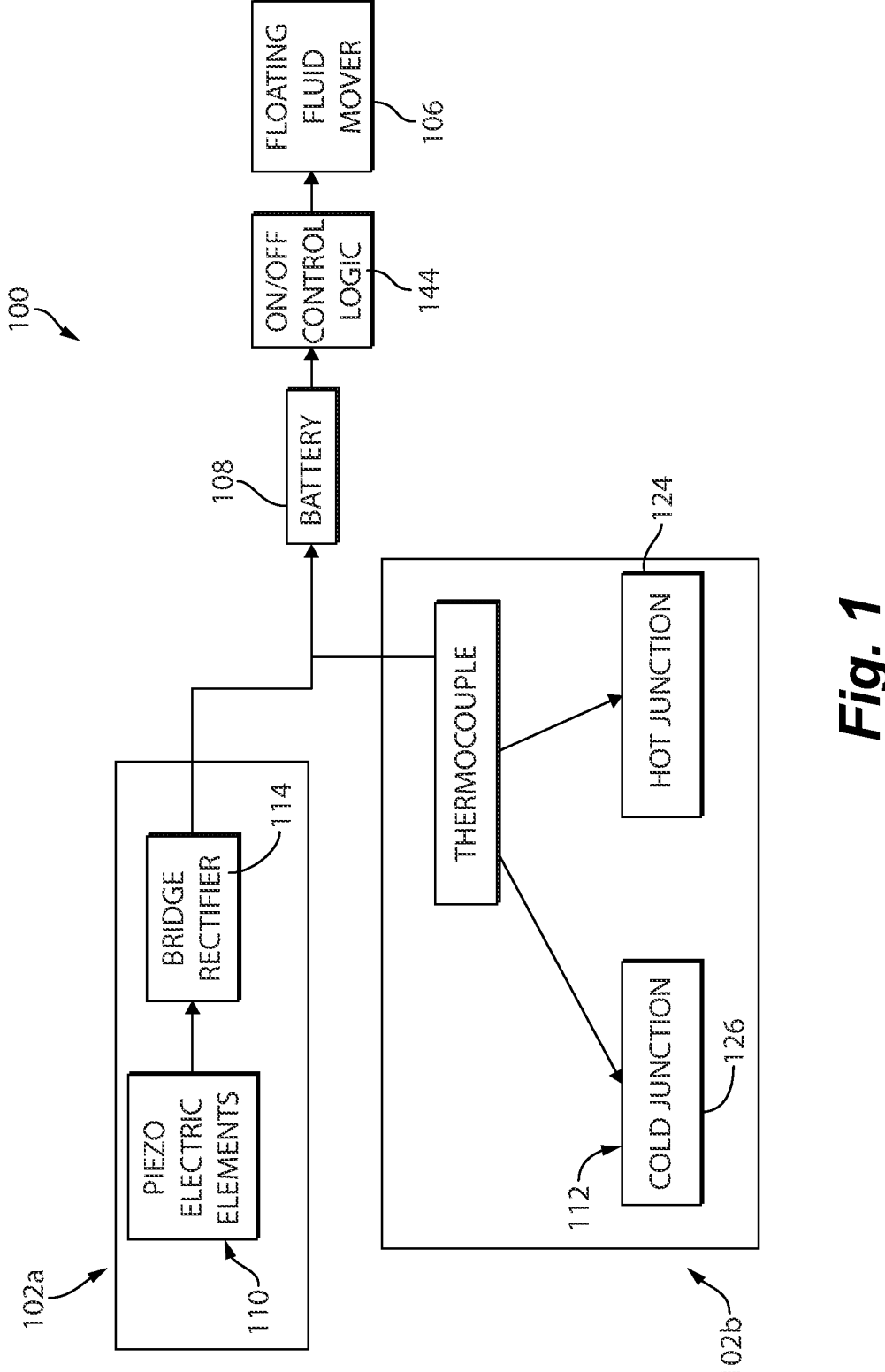
FIG. 1 is a schematic diagram of an embodiment of a fuel freeze mitigation and/or prevention system constructed in accordance with the present disclosure, showing a piezo-electric transducer and a thermocouple.

Reference will now be made to the drawings wherein like reference numerals identify similar structural features or aspects of the subject disclosure. For purposes of explanation and illustration, and not limitation, a schematic view of an exemplary embodiment of a fuel freeze mitigation and/or prevention system in accordance with the disclosure is shown in FIG. 1 and is designated generally by reference character 100. Other embodiments of the fuel freeze mitigation and/or prevention system in accordance with the disclosure, or aspects thereof, are provided in FIGS. 2-10 as will be described. The systems and methods described herein can be used to provide pro-active, self-sustaining and reliable systems and methods of mitigating and/or preventing fuel freeze.

As shown in FIGS. 1-3B, a fuel freeze mitigation and/or prevention system 100 includes a power generator 102 configured and adapted to be positioned within a fuel storage tank 104. A fluid mover device 106 is positioned within the fuel storage tank 104 in electrical communication with the power generator 102. The fluid mover device 106 (e.g. a floating blender) is configured and adapted to mitigate or prevent fuel freeze in the fuel storage tank 104. System 100 includes an ON/OFF control logic 144 configured and adapted to turn fluid mover device 106 ON or OFF depending on the temperature measured in the storage tank 104, e.g. via temperature sensor 146 (shown in FIG. 5). Temperature sensor 146 is in communication with ON/OFF control logic 144 to provide temperature data thereto. The power generator 102 provides an energy harvesting process where the energy required to power the fluid mover device 106 and prevent fuel freezing is obtained from the source of problem itself (temperature). This makes the system 100 self-sustaining. The power generator 102 includes piezoelectric transducers 110 (e.g., power source 102A) and thermocouples 112 (e.g., power source 102B) between two dissimilar metals. Battery 108 is positioned between the thermocouples 112 and the transducers 110 and the fluid mover device 106. Multiple thermocouples 112 altogether are considered a single thermopile 117 (shown in FIGS. 6-7). Piezoelectric transducers 110 and thermocouples 112 have high reliability and are known for good response time. Additionally, system 100 offers a weight reduction of more than 90% when compared with traditional bulky heat exchangers and hot water pipes, as system 100 only adds a few grams of weight with the thermocouples 112 and piezoelectric transducers 110.

With continued reference to FIGS. 1-3B, system 100 includes a battery 108 in electrical communication with both the thermocouples 112 and the transducers 110 for storing power generated by the thermocouples 112 and transducers 110. The battery 108 is electrically coupled to the fluid mover device 106 for powering the fluid mover device 106. A bridge rectifier board 114 is positioned between the piezoelectric transducers 110 and the battery 108. In the embodiments of the present disclosure, the fluid mover device 106 is shown and described as a floating blender, described in more detail below. The output energy required to operate the floating blender is approximately 1.5V to 3V and 200 mA.

Figure 2:
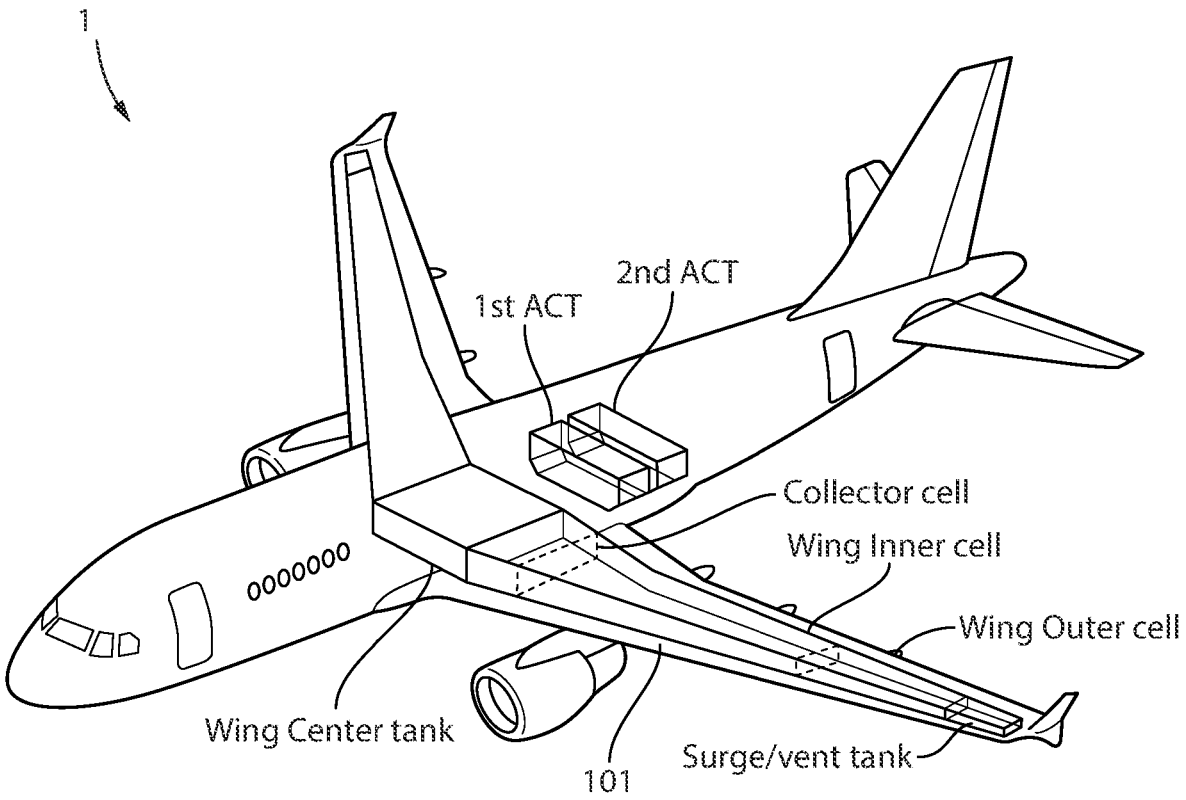
FIG. 2 is a schematic perspective view of an aircraft, showing at least one location of an aircraft fuel storage tank.
Figure 3A:
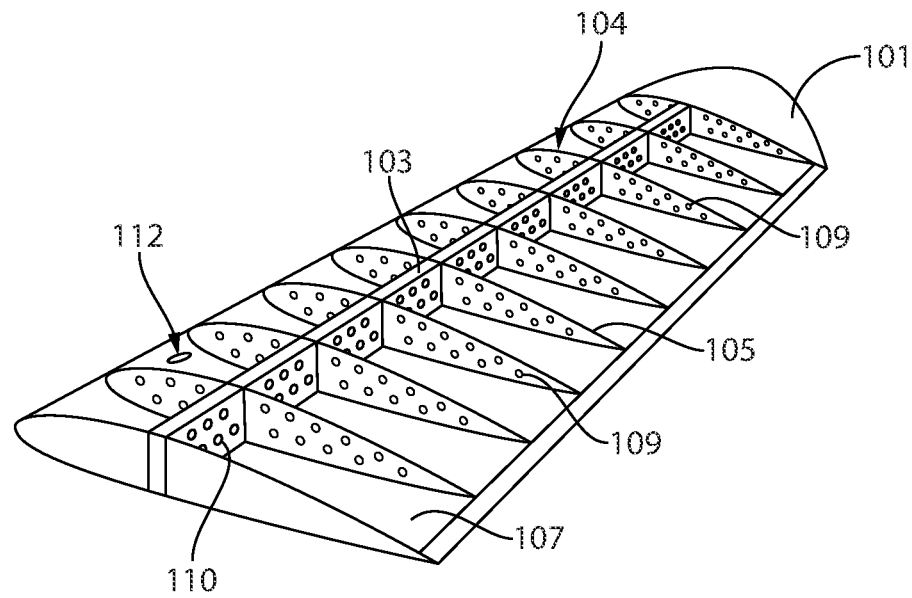
FIG. 3A is a schematic perspective view of an aircraft fuel storage tank with the fuel freeze mitigation and/or prevention system of FIG. 1, showing the spars and ribs of the aircraft wing.
Figure 3B:
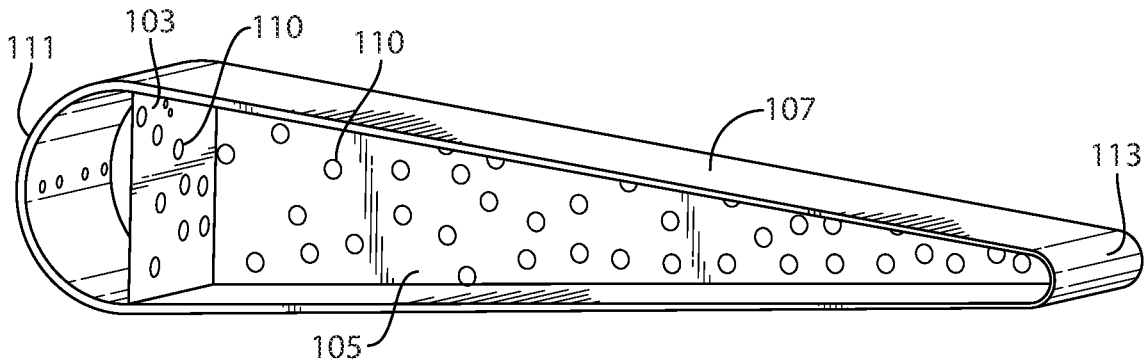
FIG. 3B is a schematic perspective view of a portion of an aircraft fuel storage tank with the fuel freeze mitigation and/or prevention system of FIG. 1, showing the piezoelectric transducers mounted to the fuel storage tank.

As shown in FIG. 2, the fuel storage tank 104 can be positioned within a wing 101 of an aircraft 1, however any other suitable location is contemplated herein, such as the central fuselage for example. Turning to FIGS. 3A and 3B, the aircraft wing 101 includes spars 103 and ribs 105 to provide structural support. The fuel storage tank 104 is defined between spars 103, ribs 105, and a skin 107. The fuel stored between the spars 103 and ribs 105 moves within the tank 104 and damping is provided through small holes 109 for fuel movement to ensure stability of the aircraft during flight. The spars 103 are positioned to extend in a longitudinal direction relative to the wing 101. The ribs 105 extend between a forward side (leading edge) 111 of the wing 101 and an aft side (trailing edge) 113 of the wing 101 at an angle relative to the spars 103. The plurality of piezoelectric transducers 110 are mounted to the ribs 105 and spars 103. Transducers 110 can be mounted on a sheet and then adhered or otherwise mounted together onto ribs 105 and spars 103. While embodiments of the system 100 are described herein as being implemented in a fuel storage tank 104 on an aircraft wing 101, those skilled in the art will readily appreciate that the system 100 can be implemented in other fuel storage tanks, e.g. those in the fuselage, or elsewhere and that system 100 can be used in integrated, rigid or flexible type fuel tanks.

As shown in FIGS. 3A and 3B, in order to act as a power generator 102, piezoelectric transducer 110 is one of a plurality of piezoelectric transducers 110 configured and adapted to generate millivolts in AC voltage during movement of fuel across the plurality of piezoelectric transducers 110. Piezoelectric transducers 110 generate voltage when stressed. Piezoelectric elements of the transducers 110 (e.g., quartz, PZT, etc.) when stressed transform in to a battery temporarily with charges depositing at different ends creating positive and negative terminals. When the stress is removed, they tend to restore to their original form by releasing the stored energy and generate mili AC voltage per compression/release cycle. With suitable arrangements, the desired DC output voltage can be obtained. The movement of fuel within the fuel tank 104 and its intermittent bombardment on the skin 107, ribs 105 and spars 103 causes compression of the piezoelectric element of the transducers 110 and creates a temporary battery and stores the compression energy. When the load is removed, the energy will be released by the piezoelectric transducer and harnessed via battery 108. In a typical wing section, e.g. that shown in FIG. 3A, for fuel density of 0.8 kg/m3, area of bombardment 45 in$^2$, for a difference in aircraft flying speed of 5 km/hour, the energy produced is 58 kg/m, and voltage produced is 300 mV. Piezoelectric transducers 110, commercially available in the form of sheets are mounted on the inner walls of the fuel tanks like skin 107, leading edge, ribs 105 and spars 103 without blocking the damping holes for fuel movement. The transducers 110 are positioned such that (a) the impact energy of the fuel float movement inside the fuel tank and (b) the strain energy due to cold temperature along the surface of leading edge are picked up quickly.

Figure 4:
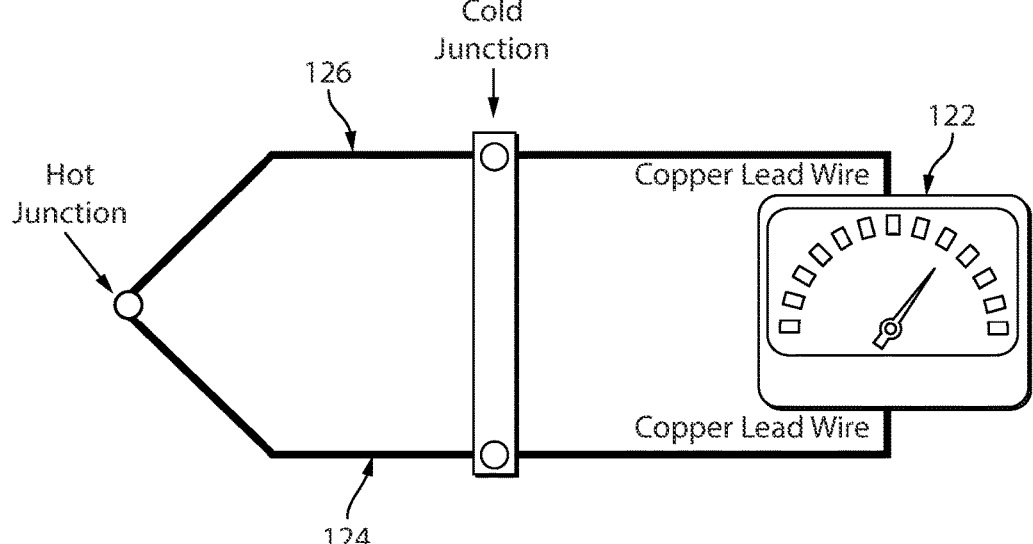
FIG. 4 is a schematic diagram of the thermocouple of the fuel freeze mitigation and/or prevention system of FIG. 1, schematically showing the positive and negative ends.

As shown in FIGS. 4-7, the thermocouple includes a negative leg 126 and a positive leg 124. The negative leg 126 is made from a first of the two dissimilar metals (e.g. Constantin) and the positive leg 124 is made from a second of the two dissimilar metals (e.g. Chromel). In embodiments, as shown in FIG. 4, the positive and negative legs 124, 126 can be joined at hot end, where a hot end refers to a union of dis-similar metal ends. The positive and negative legs 124, 126 can also be connected to respective leads at a cold junction, where the leads are made from a different metal that either of the first and/or second dissimilar metals. The negative leg 126 of each thermocouple 112 is mounted to a leading edge side 111 of the fuel storage tank 104. The positive leg 124 is positioned aft of the negative leg. The positive leg 124 of the thermocouple is configured and adapted to float in fuel 10. The system 100 includes a cable floater 121 (e.g., a wooden or plastic block), including an aperture 128 positioned within the fuel storage tank 104. The positive leg 124 of each thermocouple 112 passes through the cable floater 121 to ensure that the positive leg 124 maintains contact with an upper surface of the fuel 10.

Figure 5:
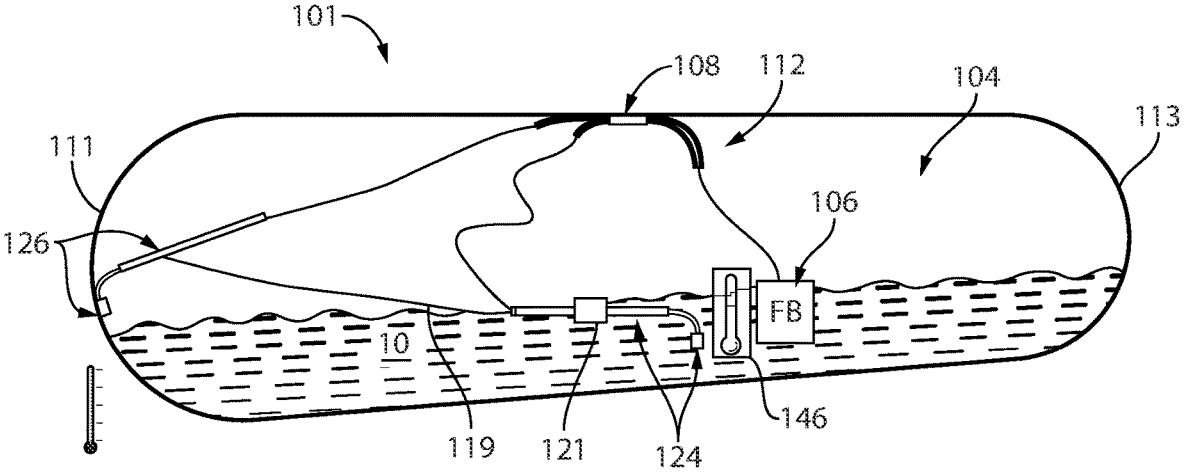
FIG. 5 is a schematic side view of a portion of an aircraft fuel storage tank with the fuel freeze mitigation and/or prevention system of FIG. 1, showing the thermocouple assembly.
Figure 6:
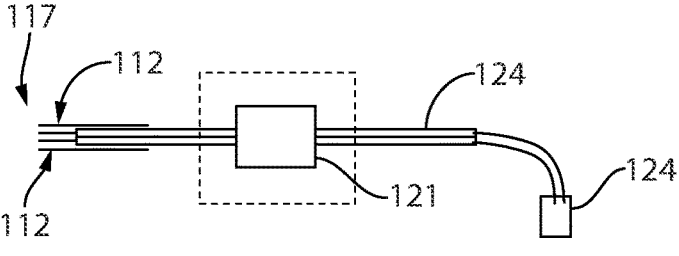
FIG. 6 is a schematic plan view of a portion of the thermocouple assembly of FIG. 5, showing the cable floater.
Figure 7:
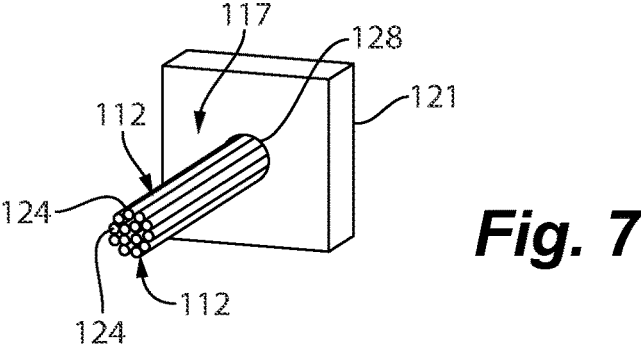
FIG. 7 is a perspective view of the cable floater of FIG. 6, showing the aperture and the thermopile threaded therethrough.

With continued reference to FIGS. 4-7, in order to operate as a power generator 102, thermocouples 112 leverage the principles of Seebeck effect. The Seebeck effect teaches that when two dissimilar metals are joined (formed in to a thermocouple) and immersed/maintained at two different temperatures an electric current is generated. For example, if a thermocouple is prepared between Antimony (Sb) and Bismuth (Bi) and joints are maintained at hot and cold temperatures, an electric current would be generated and flows from Antimony to Bismuth from the cold junction to hot junction. This could be detected through a sensitive galvanometer 122. The voltage would be larger when the elements are far away in the thermoelectric series and the temperature difference between a hot end 124 and a cold end 126 is greater. For example, for a difference in the temperature of 20° (in a type E thermocouple as shown in FIGS. 4-5) where the hot end 124 of the thermocouple is immersed into fuel and cold end 126 is connected to the leading edge 111 of the aircraft wing 101, voltage in the range of 1.2 mV per thermocouple can be produced. In embodiments, voltage (V) produced per thermocouple can be given by $V = \alpha T + \frac{1}{2}\beta T^2$, where T is the temperature difference between the hot and cold ends 124 and 126, respectively, and where α and ß refer to constants depending on the material of the thermocouple.

As shown in FIGS. 1 and 4-7, multiple thermocouples 112 are joined to form a thermopile 117. The negative leg is connected firmly to the leading edge 111 of the wing 101 to form the cold end 126 and the positive end, e.g. the hot side 124, is made to float on the fuel 10 using flexible cables 119 and cable floater 121. The positive leg 124 passes through the non-corrosive (wooden) floater 121 to ensure the positive leg 124 maintains contact with the upper surface of the fuel 10 irrespective of the consumption. In the event that the connection between the negative leg 126 and the leading edge 111 of the wing 101 is lost, performance may reduce, but still voltage will be generated as the new contact would be established between wing 101 floor and thermocouple 112 due to gravity.

With continued reference to FIGS. 4-7, type 'E' thermocouples (preferred due to high sensitivity and operating range, type K optional) are connected such that the Chromel forms the positive leg (hot end 124) and Constantin forms the negative leg (cold end 126). When the temperature difference between the hot and cold ends of the thermocouple is 20° C., the voltage produced per thermocouple is 1.2 mV. With the thermocouples 112 together as a thermopile 117, the total energy produced is approximately 1.5V and the energy is stored in the battery 108. When temperature difference is 50° C., the voltage produced is more than 3.1 mV per thermocouple. The combined output of the thermopile 117 is more than 1.5V and the energy will be stored in battery 108. When the temperature difference is 100° C., the voltage produced is 5 mV per thermocouple and the combined thermopile output is more than 1.5V. Also, the decrease in external temperature and hence increased temperature difference works "in favor" of embodiments of the present disclosure. Because system 100 operates in a controlled environment ensuring the temperature is maintained, there is no possibility of fire hazard as the heat produced in the process does not increase the fuel temperature by 1 degree/set temperature (therefore fire triangle formation or arcing is prevented).

Figure 8:
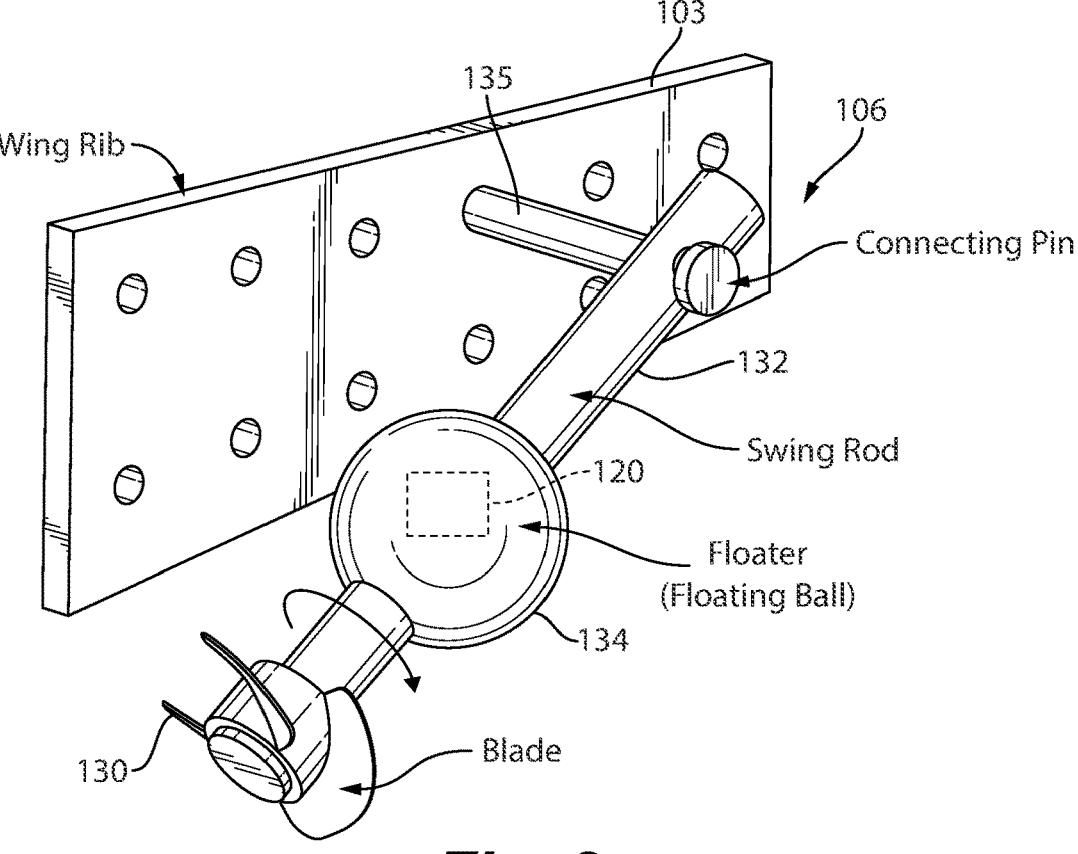
FIG. 8 is a perspective view of a portion of the fuel freeze mitigation and/or prevention system of FIG. 1, showing the fluid mover device in an inclined position relative to a wing rib.
Figure 9:
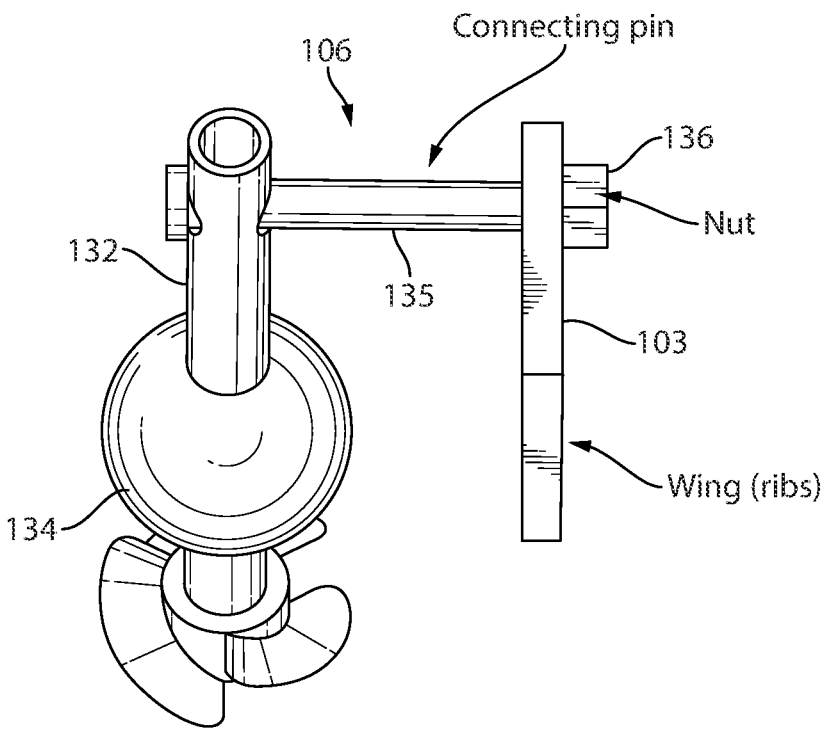
FIG. 9 is a rear plan view of a portion of the fuel freeze mitigation and/or prevention system of FIG. 1, showing the fluid mover device from a trailing edge side connected to the wing rib.
Figure 10:
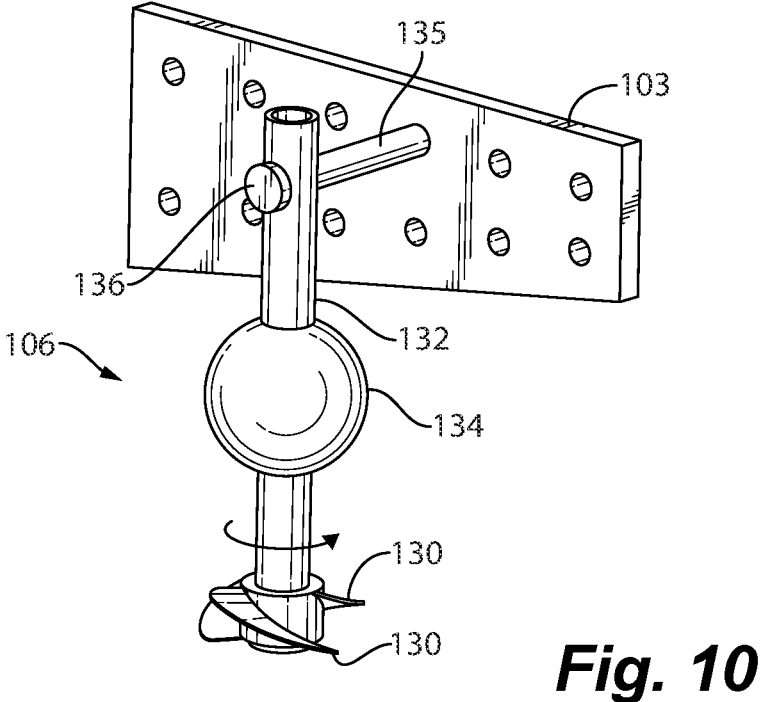
FIG. 10 is a perspective view of a portion of the fuel freeze mitigation and/or prevention system of FIG. 1, showing the fluid mover device in an inclined position relative to the wing rib.

With reference now to FIGS. 8-10, the fluid mover device 106 is made up of light-weight materials such as plastic or delrin, for example. The assembly consists of motor driven blades 130 connected to the swing rod 132. A motor 120 can be positioned within a blend float 134 and can be operatively connected to the swing rod 132 to rotate at least a portion thereof. The blend float 134 connected to the swing rod 132 ensures that the float floats on the fuel surface thereby causing changes in the inclination of the swing rod and blades in relation to fuel consumption. A connecting pin 135 connects the ribs 105 of the wing 101 and the swing rod through a non-corrosive nut 136. Enough clearance is provided between swing rod and connecting pin to create a revolute joint. The swing rod 132 includes a first end 138 and a second end 140. The second end 140 includes blades 130 mounted thereon. The second end 140 of the swing rod 132 is configured and adapted to rotate relative to the first end 138 when driven by motor 120. The first end 138 of the swing rod 132 is operatively connected rib 103 of the fuel storage tank 104. The first end 138 of the swing rod 132 is coupled to the rib 103 of the fuel storage tank 104 with connecting pin 135 positioned perpendicular to the swing rod 132

In accordance with another aspect, a method for mitigating or preventing fuel freeze in a fuel storage tank, e.g. tank 104, includes harvesting energy with a power generator, e.g. power generator 102, positioned within the fuel storage tank, charging a battery, e.g. battery 108, with the harvested energy, monitoring a fuel temperature inside the fuel storage tank, and turning a fluid mover device, e.g. fluid mover device 106, positioned within the fuel storage tank ON or OFF depending on at least one of a manual command or the fuel temperature inside the fuel storage tank to mitigate or prevent fuel freeze in the fuel storage tank. When an aircraft is on ground, no energy is harvested as the temperature difference between external ambient temperature and that of the fuel tank is less. Also, no fuel bombardment is occurring within the walls of its container. If required, the stored energy of the battery could be used to drive the fluid mover device and ensure fuel doesn't freeze. As the aircraft moves away from the parking bay towards runway, the inaccuracies of runway, intermittent and shimmy movement causes little bombardment of fuel on its walls causing nano- to micro-voltage of energy extracted per transducer, e.g. transducer 110, and the battery gets charged accordingly. As the velocity of the aircraft gradually increases, the energy stored in the battery also increases accordingly.

When the aircraft is in motion, the fuel inside fuel tank is moderately warmer than the ambient air temperature. The battery acts and the fluid mover device operates to ensure the fuel at the fuel air interface inside the wing is kept warm throughout the duration of flight. As the aircraft starts flying at higher altitudes or due to ambient weather conditions, the leading edge, e.g. leading edge 111, of the aircraft wing may experience cold temperatures. The energy stored in the battery increases as the difference between the temperature of the fuel tank and the ambient temperature increases. When the aircraft is in motion at different altitudes, due to little vibration, the intermittent bombardment of the fuel on its wall generate emf which is stored in the battery.

An ON/OFF control logic, e.g. ON/OFF control logic 144, commands the fluid mover device depending on a temperature threshold of the fuel inside the fuel tank. The temperature threshold can be set based on a variety of conditions. As the fuel temperature starts to reduce below a permissible value by 1°, the logic acts and the fluid mover device starts to operate. The surface and subsurface level stirring of fuel prevents crystallization and also makes it a bit warmer and maintains the fuel temperature. The ON/OFF logic switches off the fluid mover device once the desired temperature has been achieved. Those skilled in the art will readily appreciate that while the control logic can automatically command the fluid mover device, embodiments herein may also include a manual override option where the pilot can choose to operate or not operate the fluid mover device, as per the design philosophy of the air framer.

Those skilled in the art will readily appreciate that system 100 can be installed as a retrofit unit for long range flights which are expected to fly through cold regions. Since the duration and speed of the fluid mover device 106 is less within the fluid medium, stability issues does not arise. Because system 100 can be implemented on both port and starboard sides at same locations, the center of gravity of the aircraft will not be altered. Once system 100 is installed, the maintenance issues are minimal. For example, system 100 could be inspected by boroscope every 2-3 years.

The methods and systems of the present disclosure, as described above and shown in the drawings, provide for fuel freeze mitigation and/or prevention systems that provide light-weight and sustainable methods for preventing fuel freezing, even when flying at higher altitudes or in colder climates, for example. Embodiments may work to prevent or mitigate formation of fungi in the fuel tank. In certain embodiments, the methods and systems of the present disclosure may improve pilot productivity and decrease pilot confusion if the aircraft experiences a freezing event. While the apparatus and methods of the subject disclosure have been shown and described with reference to preferred embodiments, those skilled in the art will readily appreciate that changes and/or modifications may be made thereto without departing from the scope of the subject disclosure.

The invention claimed is:

1. A fuel freeze mitigation and/or prevention system:
   a battery;
   a power generator configured and adapted to be positioned within a fuel storage tank, wherein the power generator includes a thermocouple between two metals connected to the battery, the thermocouple comprising:
      a negative leg made from a first of the two metals; and
      a positive leg is made from a second of the two metals;
   a fluid mover device in electrical communication with the power generator configured and adapted to be positioned within the fuel storage tank to mitigate or prevent fuel freeze in the fuel storage tank; and
   a cable floater including an aperture positioned within the fuel storage tank, wherein the positive leg of the thermocouple passes through the cable floater to ensure that the positive leg maintains contact with an upper surface of the fuel.

2. The system as recited in claim 1, wherein the battery is in electrical communication with the power generator for storing power generated by the power generator and with the fluid mover device for powering the fluid mover device.

3. The system as recited in claim 1, wherein the fluid mover device includes a swing rod having a first end and a second end, wherein the second end includes at least one blade.

4. The system as recited in claim 3, wherein the second end of the swing rod is configured and adapted to rotate relative to the first end.

5. The system as recited in claim 3, wherein the first end of the swing rod is operatively connected to a rib of the fuel storage tank.

6. The system as recited in claim 5, wherein the first end of the swing rod is coupled to the rib of the fuel storage tank with a connecting pin positioned perpendicular to the swing rod.

7. The system as recited in claim 1, wherein the fuel storage tank is positioned within a wing of an aircraft.

8. The system as recited in claim 7, wherein the fuel storage tank includes at least one spar positioned therein extending in a longitudinal direction relative to the wing.

9. The system as recited in claim 8, wherein the fuel storage tank includes at least one rib extending between a forward side of the wing and an aft side of the wing at an angle relative to the spar.

10. The system as recited in claim 9, wherein the power generator includes a plurality of piezoelectric transducers, wherein the plurality of piezoelectric transducers are mounted to at least one of the at least one rib or the at least one spar.

11. The system as recited in claim 1, wherein the battery is positioned between the thermocouple and the fluid mover device.

12. A fuel freeze mitigation and/or prevention system:
   a battery;
   a power generator configured and adapted to be positioned within a fuel storage tank, wherein the power generator includes a thermocouple between two metals connected to the battery, the thermocouple comprising:
      a negative leg made from a first of the two metals; and
      a positive leg is made from a second of the two metals;

a fluid mover device in electrical communication with the power generator configured and adapted to be positioned within the fuel storage tank to mitigate or prevent fuel freeze in the fuel storage tank; and a fuel storage tank positioned within a wing of an aircraft, wherein the negative leg of the thermocouple is mounted to a leading edge side of the fuel storage tank and wherein the positive leg is positioned aft of the negative leg, and wherein the positive leg of the thermocouple is configured and adapted to float in fuel.

13. The system as recited in claim 1, wherein the thermocouple includes a plurality of thermocouples joined together to form a thermopile.

14. A method for mitigating or preventing fuel freeze in a fuel storage tank, the method comprising:

harvesting energy with a power generator positioned within the fuel storage tank, wherein the power generator includes a thermocouple between two metals connected to a battery, the thermocouple comprising:

a negative leg made from a first of the two metals; and a positive leg is made from a second of the two metals, wherein the positive leg of the thermocouple passes through an aperture of a cable floater to ensure that the positive leg maintains contact with an upper surface of the fuel;

charging the battery with the harvested energy;

monitoring a fuel temperature inside the fuel storage tank; and turning a fluid mover device positioned within the fuel storage tank ON or OFF depending on at least one of a manual command or the fuel temperature inside the fuel storage tank to mitigate or prevent fuel freeze in the fuel storage tank.

* * * * *